US012651675B2

(12) United States Patent
Li et al.

(10) Patent No.: US 12,651,675 B2
(45) Date of Patent: Jun. 9, 2026

(54) ANTI-NUCLEAR RADIATION MAGNETIC FLUID SEALING DEVICE

(71) Applicants: TSINGHUA UNIVERSITY, Beijing (CN); BEIJING JIAOTONG UNIVERSITY, Beijing (CN)

(72) Inventors: Decai Li, Beijing (CN); Sijia Liu, Beijing (CN); Zhibin Wang, Beijing (CN); Xinzhi He, Beijing (CN)

(73) Assignees: TSINGHUA UNIVERSITY, Beijing (CN); BEIJING JIAOTONG UNIVERSITY, Beijing (CN)

( * ) Notice: Subject to any disclaimer, the term of this patent is extended or adjusted under 35 U.S.C. 154(b) by 300 days.

(21) Appl. No.: 18/647,797

(22) Filed: Apr. 26, 2024

(65) Prior Publication Data

US 2025/0104881 A1 Mar. 27, 2025

(30) Foreign Application Priority Data

Sep. 27, 2023 (CN) ........................ 202311257700.4

(51) Int. Cl.
*G21F 1/02* (2006.01)

(52) U.S. Cl.
CPC .................................. *G21F 1/023* (2013.01)

(58) Field of Classification Search
CPC .. G21F 1/023; G21F 3/00; F16C 19/54; F16C 2210/06; F16C 33/765; F16J 15/43
See application file for complete search history.

(56) References Cited

U.S. PATENT DOCUMENTS 5,059,039 A * 10/1991 Adolfsson ............. F16C 37/002 384/114
5,161,900 A * 11/1992 Bougathou ......... F16C 33/1035 277/410
2010/0090413 A1* 4/2010 Mahoney ................ F16J 15/43 277/410

(Continued)

FOREIGN PATENT DOCUMENTS

CN 2660236 Y * 12/2004
CN 102969873 A * 3/2013

(Continued)

*Primary Examiner* — David A Vanore
(74) *Attorney, Agent, or Firm* — Hodgson Russ LLP

(57) ABSTRACT

An anti-nuclear radiation magnetic fluid sealing device includes a magnetically conductive rotating shaft, a magnetically conductive housing, a left snap ring, a left bearing, a left magnetically isolating ring, a left pole shoe, a magnetically isolating sleeve, an outer permanent magnet, an inner permanent magnet, a right pole shoe, a right magnetically isolating ring, a right bearing, a right snap ring, an end cover, an anti-radiation coating, an anti-magnetic coating, a magnetic fluid I, and a magnetic fluid II. An outer magnetic circuit and an inner magnetic circuit are formed using the magnetically isolating sleeve. The magnetically conductive housing, the left pole shoe, the outer permanent magnet, the right pole shoe, and the magnetic fluid I forms a magnetic fluid static seal. The magnetically conductive rotating shaft, the left pole shoe, the inner permanent magnet, the right pole shoe, and the magnetic fluid II form a magnetic fluid dynamic seal.

10 Claims, 1 Drawing Sheet

(56) References Cited

U.S. PATENT DOCUMENTS

| | | | | |
|---|---|---|---|---|
| 2014/0163664 | A1* | 6/2014 | Goldsmith | A61B 17/0057 604/93.01 |
| 2019/0247050 | A1* | 8/2019 | Goldsmith | A61F 2/82 |
| 2024/0141998 | A1* | 5/2024 | Li | F16J 15/43 |

FOREIGN PATENT DOCUMENTS

| | | | | | |
|---|---|---|---|---|---|
| CN | 112049937 | A | * | 12/2020 | F16J 15/43 |
| EP | 2979545 | A2 | * | 2/2016 | A01K 89/011223 |
| EP | 3156674 | A1 | * | 4/2017 | F16C 33/6644 |

* cited by examiner

ANTI-NUCLEAR RADIATION MAGNETIC FLUID SEALING DEVICE

CROSS-REFERENCE TO RELATED APPLICATION

This application claims priority to Chinese Patent Application No. 202311257700.4, filed on Sep. 27, 2023, the entire disclosure of which is incorporated herein by reference.

FIELD

The present disclosure belongs to the field of mechanical engineering sealing technology, and more particularly to an anti-nuclear radiation magnetic fluid sealing device.

BACKGROUND

Magnetic fluid seals have been widely used in industrial equipment in various fields due to their advantages of zero leakage, long service life, and no pollution. In the field of nuclear energy, many equipment are exposed to a variety of high-energy radiation environments for a long time during operation, and their components have different degrees of aging and damage due to the nuclear radiation. In such special occasions, a rubber seal ring in a traditional magnetic fluid sealing device is prone to damage after long-term radiation, and a permanent magnet and a magnetic fluid are also prone to being affected by the radiation, which in turns affects the pressure-resistance effect and service life of the magnetic fluid seal. Consequently, it is necessary to provide an anti-nuclear radiation magnetic fluid sealing device that does not require any rubber ring.

SUMMARY

An anti-nuclear radiation magnetic fluid sealing device according to embodiments of the present disclosure includes a magnetically conductive rotating shaft, a magnetically conductive housing, a left snap ring, a left bearing, a left magnetically isolating ring, a left pole shoe, a magnetically isolating sleeve, an outer permanent magnet, an inner permanent magnet, a right pole shoe, a right magnetically isolating ring, a right bearing, a right snap ring, an end cover, an anti-radiation coating, an anti-magnetic coating, a magnetic fluid I, and a magnetic fluid II.

An inner side surface of the magnetically conductive housing is coated with the anti-radiation coating and an outer side surface of the magnetically conductive housing is coated with the anti-magnetic coating, forming the magnetically conductive housing having the anti-radiation coating and the anti-magnetic coating. An outer side surface and a right side surface of the end cover are coated with the anti-radiation coating, forming the end cover having the anti-radiation coating. An outer side surface and an inner side surface of the magnetically isolating sleeve are each provided with two annular protrusions, and the outer permanent magnet and the inner permanent magnet are respectively located on an outer side and an inner side of the annular protrusions that are on the outer and inner side surfaces of the magnetically isolating sleeve. A right side surface of the left pole shoe and a left side surface of the right pole shoe are each provided with an annular groove, and the magnetically isolating sleeve is mounted in the corresponding grooves. The left snap ring, the left bearing, the left magnetically isolating ring, the left pole shoe, the magnetically isolating sleeve, the outer permanent magnet, the inner permanent magnet, the magnetic fluid I, the magnetic fluid II, the right pole shoe, the right magnetically isolating ring, the right bearing, and the right snap ring are sequentially mounted on the magnetically conductive rotating shaft from left to right, which is then mounted into the magnetically conductive housing having the anti-radiation coating and the anti-magnetic coating. The end cover having the anti-radiation coating is connected to the magnetically conductive housing with the anti-radiation coating and the anti-magnetic coating by a screw.

DETAILED DESCRIPTION

Embodiments of the present disclosure will be described in detail below. The embodiments described are only intended to explain the present disclosure and shall not be construed as any form of limitation on the present disclosure. The present disclosure is further elaborated with reference to the accompanying drawings.

Figure 1:
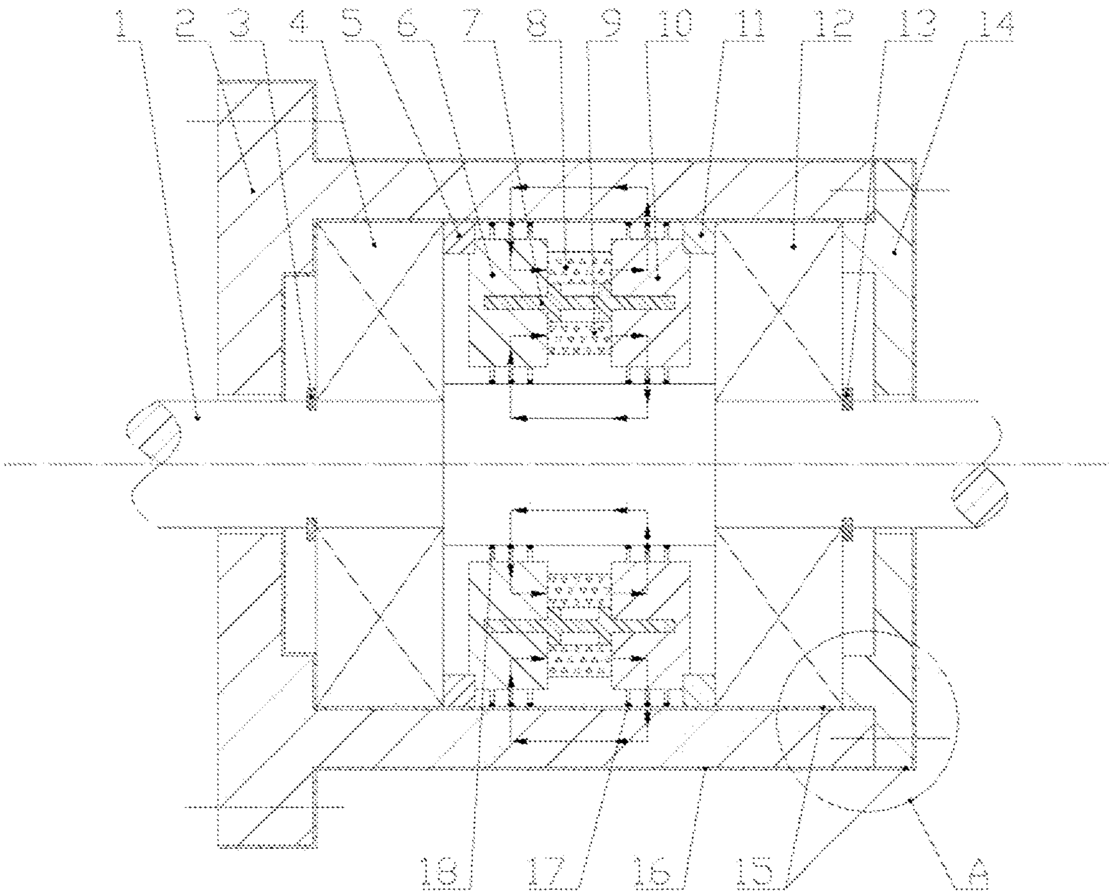
FIG. 1 is a schematic view of an anti-nuclear radiation magnetic fluid sealing device according to embodiments of the present disclosure.
Figure 2:
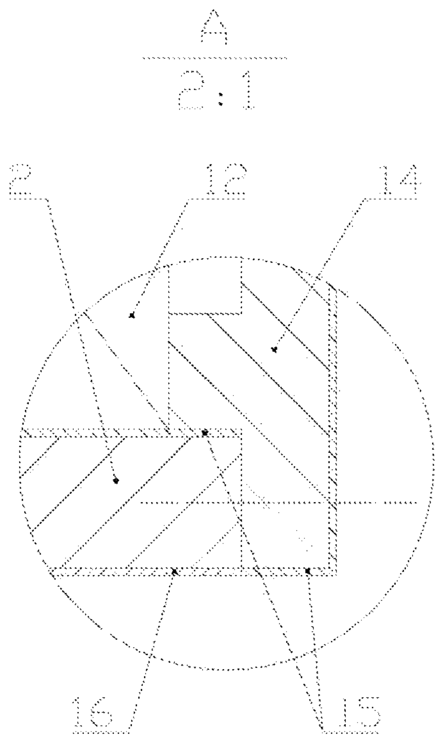
FIG. 2 is a partially enlarged view of part A according to embodiments of the present disclosure.

With reference to FIG. 1 and FIG. 2, an anti-nuclear radiation magnetic fluid sealing device includes a magnetically conductive rotating shaft 1, a magnetically conductive housing 2, a left snap ring 3, a left bearing 4, a left magnetically isolating ring 5, a left pole shoe 6, a magnetically isolating sleeve 7, an outer permanent magnet 8, an inner permanent magnet 9, a right pole shoe 10, a right magnetically isolating ring 11, a right bearing 12, a right snap ring 13, an end cover 14, an anti-radiation coating 15, an anti-magnetic coating 16, a magnetic fluid I 17, and a magnetic fluid II 18.

Connection among the various parts of the device are as follows. An inner side surface of the magnetically conductive housing 2 is coated with the anti-radiation coating 15 and an outer side surface of the magnetically conductive housing 2 is coated with the anti-magnetic coating 16, forming the magnetically conductive housing 2 having the anti-radiation coating 15 and the anti-magnetic coating 16. An outer side surface and a right side surface of the end cover 14 are coated with the anti-radiation coating 15, forming the end cover 14 having the anti-radiation coating 15. An outer side surface and an inner side surface of the magnetically isolating sleeve 7 are each provided with two annular protrusions, and the outer permanent magnet 8 and the inner permanent magnet 9 are respectively located on an outer side and an inner side of the annular protrusions that are on the outer and inner side surfaces of the magnetically isolating sleeve 7. A right side surface of the left pole shoe 6 and a left side surface of the right pole shoe 10 are each provided with an annular groove, and the magnetically isolating sleeve 7 is mounted in the corresponding grooves. The left snap ring 3, the left bearing 4, the left magnetically isolating ring 5, the left pole shoe 6, the magnetically isolating sleeve 7, the outer permanent magnet 8, the inner permanent magnet 9, the magnetic fluid I 17, the magnetic fluid II 18, the right pole shoe 10, the right magnetically isolating ring 11, the right bearing 12, and the right snap ring 13 are sequentially mounted on the magnetically conductive rotating shaft 1 from left to right, which is then mounted into the magnetically conductive housing 2 having the anti-radiation coating 15 and the anti-magnetic coating 16. The end cover 14 having the anti-radiation coating 15 is connected to the magnetically conductive housing 2 with the anti-radiation coating 15 and the anti-magnetic coating 16 by a screw.

The anti-radiation coating 15 on the inner side surface of the magnetically conductive housing 2, and on the outer side surface and the right side surface of the end cover 14 can provide good radiation protection for various parts inside the magnetic fluid sealing device in special occasions such as nuclear radiation. The anti-magnetic coating 16 coated on the outer side surface of the magnetically conductive housing 2 not only avoids magnetic leakage, but also prevents external magnetic materials from being attracted.

The outer permanent magnet 8 and the inner permanent magnet 9 are axially magnetized ring-shaped permanent magnets with a same magnetization direction, and materials with good radiation resistance and high temperature resistance are selected and used, such as samarium cobalt permanent magnets. An outer circumferential surface of the two annular protrusions on the outer side surface of the magnetically isolating sleeve 7 has a same diameter as an inner circumferential surface of the outer permanent magnet 8, and an inner circumferential surface of the two annular protrusions on the inner side surface of the magnetically isolating sleeve 7 has a same diameter as an outer circumferential surface of the inner permanent magnet 9. The annular protrusions of the magnetically isolating sleeve 7 provide radial positioning for the outer permanent magnet 8 and the inner permanent magnet 9.

A width of the annular groove on the right side surface of the left pole shoe 6 and a width of the annular groove on the left side surface of the right pole shoe 10 are identical to a thickness of the magnetically isolating sleeve 7, and the magnetically isolating sleeve 7 is mounted in the corresponding grooves. Left side surfaces of the two annular protrusions on the outer and inner side surfaces of a left side of the magnetically isolating sleeve 7 are parallel to left side surfaces of the outer permanent magnet 8 and the inner permanent magnet 9, and fit with the right side surface of the left pole shoe 6 after installation. Right side surfaces of the two annular protrusions on the outer and inner side surfaces of a right side of the magnetically isolating sleeve 7 are parallel to right side surfaces of the outer permanent magnet 8 and the inner permanent magnet 9, and fit with the left side surface of the right pole shoe 10 after installation. The magnetically isolating sleeve 7, the outer permanent magnet 8, and the inner permanent magnet 9 are located between the left pole shoe 6 and the right pole shoe 10, providing axial positioning for the magnetically isolating sleeve 7, the outer permanent magnet 8, and the inner permanent magnet 9.

The left side surface of the left pole shoe 6 and the right side surface of the right pole shoe 10 are each provided with an annular protrusion. An outer circumferential surface of the annular protrusion has a same diameter as an inner circumferential surface of the left magnetically isolating ring 5 and an inner circumferential surface of the right magnetically isolating ring 11, and the left magnetically isolating ring 5 and the right magnetically isolating ring 11 provide axial and radial positioning for the left pole shoe 6 and the right pole shoe 10.

An outer side surface of the left pole shoe 6 and an outer side surface of the right pole shoe 10 are each provided with a plurality of pole teeth. Preferably, the number of pole teeth is 1~20. There is a gap between the pole teeth and a corresponding position of the inner side surface of the magnetically conductive housing 2 having the anti-radiation coating 15 and the anti-magnetic coating 16, and a value of the gap ranges from 0.1 mm to 0.2 mm. The magnetic fluid I 17 is injected at the gap. The magnetically conductive housing 2 having the anti-radiation coating 15 and the anti-magnetic coating 16, together with the left pole shoe 6, the outer permanent magnet 8, the right pole shoe 10, and the magnetic fluid I 17, forms a multi-stage magnetic fluid static seal, replacing rubber seal rings in traditional magnetic fluid seals, playing a static sealing role, avoiding damage to the rubber seal rings caused by nuclear radiation, and ensuring the pressure-resistance effect of the sealing device.

An inner side surface of the left pole shoe 6 and an inner side surface of the right pole shoe 10 are each provided with a plurality of pole teeth. Preferably, the number of pole teeth is 1~20. The magnetically conductive rotating shaft 1 includes a shaft shoulder at a position corresponding to the left pole shoe 6 and at a position corresponding to the right pole shoe 10. There is a gap between the pole teeth on the inner side surfaces of the left pole shoe 6 and the right pole shoe 10 and the shaft shoulders of the magnetically conductive rotating shaft 1, and a value of the gap ranges from 0.1 mm to 0.2 mm. The magnetic fluid II 18 is injected at the gap. The magnetically conductive rotating shaft 1, together with the left pole shoe 6, the inner permanent magnet 9, the right pole shoe 10, and the magnetic fluid II 18, forms a multi-stage magnetic fluid dynamic seal.

The magnetically isolating sleeve 7 divides the left pole shoe 6 and the right pole shoe 10 into two parts (i.e., an outer part and an inner part) to form two magnetic circuits (i.e., an outer magnetic circuit and an inner magnetic circuit), improving the overall sealing effect and ensuring the pressure resistance and reliability of the magnetic fluid sealing device. In an outer static sealing magnetic circuit, a magnetic field starts from an N pole of the outer permanent magnet 8, passes through the right pole shoe 10, the magnetic fluid I 17, the magnetically conductive housing 2 having the anti-radiation coating 15 and the anti-magnetic coating 16, the magnetic fluid I 17, and the left pole shoe 6, and returns to an S pole of the outer permanent magnet 8. In an inner dynamic sealing magnetic circuit, a magnetic field starts from an N pole of the inner permanent magnet 9, passes through the right pole shoe 10, the magnetic fluid II 18, the magnetically conductive rotating shaft 1, the magnetic fluid II 18, and the left pole shoe 6, and returns to an S pole of the inner permanent magnet 9.

An outer circumferential surface of the magnetically conductive rotating shaft 1 is provided with two annular grooves, and the left snap ring 3 and the right snap ring 13 are arranged in the two annular grooves. The left snap ring 3 and the shaft shoulder of the magnetically conductive rotating shaft 1 provide axial positioning for an inner ring of the left bearing 4; and the shaft shoulder of the magnetically conductive rotating shaft 1 and the right snap ring 13 provide axial positioning for an inner ring of the right bearing 12.

The magnetically conductive rotating shaft 1, the magnetically conductive housing 2, the left pole shoe 9, and the right pole shoe 10 are made of magnetic materials with good radiation resistance, such as cobalt steel.

The magnetic fluid I and the magnetic fluid II are radiation-resistant magnetic fluids.

What is claimed is:

1. An anti-nuclear radiation magnetic fluid sealing device, comprising: a magnetically conductive rotating shaft, a magnetically conductive housing, a left snap ring, a left bearing, a left magnetically isolating ring, a left pole shoe, a magnetically isolating sleeve, an outer permanent magnet, an inner permanent magnet, a right pole shoe, a right magnetically isolating ring, a right bearing, a right snap ring, an end cover, an anti-radiation coating, an anti-magnetic coating, a magnetic fluid I, and a magnetic fluid II, wherein an inner side surface of the magnetically conductive housing is coated with the anti-radiation coating and an outer side surface of the magnetically conductive housing is coated with the anti-magnetic coating, forming the magnetically conductive housing having the anti-radiation coating and the anti-magnetic coating; an outer side surface and a right side surface of the end cover are coated with the anti-radiation coating, forming the end cover having the anti-radiation coating; an outer side surface and an inner side surface of the magnetically isolating sleeve are each provided with two annular protrusions, and the outer permanent magnet and the inner permanent magnet are respectively located on an outer side and an inner side of the annular protrusions that are on the outer side surface and the inner side surface of the magnetically isolating sleeve; a right side surface of the left pole shoe and a left side surface of the right pole shoe are each provided with an annular groove, and the magnetically isolating sleeve is mounted in the corresponding grooves; the left snap ring, the left bearing, the left magnetically isolating ring, the left pole shoe, the magnetically isolating sleeve, the outer permanent magnet, the inner permanent magnet, the magnetic fluid I, the magnetic fluid II, the right pole shoe, the right magnetically isolating ring, the right bearing, and the right snap ring are sequentially mounted on the magnetically conductive rotating shaft from left to right, which is then mounted into the magnetically conductive housing having the anti-radiation coating and the anti-magnetic coating; the end cover having the anti-radiation coating is connected to the magnetically conductive housing with the anti-radiation coating and the anti-magnetic coating by a screw.

2. The anti-nuclear radiation magnetic fluid sealing device according to claim 1, wherein:

the outer permanent magnet and the inner permanent magnet are axially magnetized ring-shaped permanent magnets with a same magnetization direction, and materials with good radiation resistance and high temperature resistance are selected and used; an outer circumferential surface of the two annular protrusions on the outer side surface of the magnetically isolating sleeve has a same diameter as an inner circumferential surface of the outer permanent magnet, and an inner circumferential surface of the two annular protrusions on the inner side surface of the magnetically isolating sleeve has a same diameter as an outer circumferential surface of the inner permanent magnet; the annular protrusions of the magnetically isolating sleeve provide radial positioning for the outer permanent magnet and the inner permanent magnet.

3. The anti-nuclear radiation magnetic fluid sealing device according to claim 1, wherein:

a width of the annular groove on the right side surface of the left pole shoe and a width of the annular groove on the left side surface of the right pole shoe are identical to a thickness of the magnetically isolating sleeve, and the magnetically isolating sleeve is mounted in the corresponding grooves; left side surfaces of the two annular protrusions on the outer side surface and the inner side surface of a left side of the magnetically isolating sleeve are parallel to left side surfaces of the outer permanent magnet and the inner permanent magnet, and fit with the right side surface of the left pole shoe after installation; right side surfaces of the two annular protrusions on the outer side surface and the inner side surface of a right side of the magnetically isolating sleeve are parallel to right side surfaces of the outer permanent magnet and the inner permanent magnet, and fit with the left side surface of the right pole shoe after installation; the magnetically isolating sleeve, the outer permanent magnet, and the inner permanent magnet are located between the left pole shoe and the right pole shoe, providing axial positioning for the magnetically isolating sleeve, the outer permanent magnet, and the inner permanent magnet.

4. The anti-nuclear radiation magnetic fluid sealing device according to claim 1, wherein:

the left side surface of the left pole shoe and the right side surface of the right pole shoe are each provided with an annular protrusion; an outer circumferential surface of the annular protrusion has a same diameter as an inner circumferential surface of the left magnetically isolating ring and an inner circumferential surface of the right magnetically isolating ring; and the left magnetically isolating ring and the right magnetically isolating ring provide axial and radial positioning for the left pole shoe and the right pole shoe.

5. The anti-nuclear radiation magnetic fluid sealing device according to claim 1, wherein:

an outer side surface of the left pole shoe and an outer side surface of the right pole shoe are each provided with a plurality of pole teeth; there is a gap between the plurality of pole teeth and a corresponding position of the inner side surface of the magnetically conductive housing having the anti-radiation coating and the anti-magnetic coating, and the magnetic fluid I is injected at the gap; the magnetically conductive housing having the anti-radiation coating and the anti-magnetic coating, together with the left pole shoe, the outer permanent magnet, the right pole shoe, and the magnetic fluid I, forms a multi-stage magnetic fluid static seal.

6. The anti-nuclear radiation magnetic fluid sealing device according to claim 1, wherein:

an inner side surface of the left pole shoe and an inner side surface of the right pole shoe are each provided with a plurality of pole teeth; the magnetically conductive rotating shaft comprises a shaft shoulder at a position corresponding to the left pole shoe and at a position corresponding to the right pole shoe; there is a gap between the plurality of pole teeth on the inner side surface of the left pole shoe and the inner side surface of the right pole shoe and the shaft shoulders of the magnetically conductive rotating shaft, and the magnetic fluid II is injected at the gap; the magnetically conductive rotating shaft, together with the left pole shoe, the inner permanent magnet, the right pole shoe, and the magnetic fluid II, forms a multi-stage magnetic fluid dynamic seal.

7. The anti-nuclear radiation magnetic fluid sealing device according to claim 1, wherein:

the magnetically isolating sleeve divides the left pole shoe and the right pole shoe into an outer part and an inner part to form an outer magnetic circuit and an inner magnetic circuit.

8. The anti-nuclear radiation magnetic fluid sealing device according to claim 1, wherein:

an outer circumferential surface of the magnetically conductive rotating shaft is provided with two annular grooves, and the left snap ring and the right snap ring are arranged in the two annular grooves; the left snap ring and a shaft shoulder of the magnetically conductive rotating shaft provide axial positioning for an inner ring of the left bearing; and the shaft shoulder of the magnetically conductive rotating shaft and the right snap ring provide axial positioning for an inner ring of the right bearing.

9. The anti-nuclear radiation magnetic fluid sealing device according to claim 1, wherein the magnetically conductive rotating shaft, the magnetically conductive housing, the left pole shoe, and the right pole shoe are made of magnetic materials with good radiation resistance.

10. The anti-nuclear radiation magnetic fluid sealing device according to claim 1, wherein the magnetic fluid I and the magnetic fluid II are radiation-resistant magnetic fluids.

* * * * *